United States Patent Office 3,789,030
Patented Jan. 29, 1974

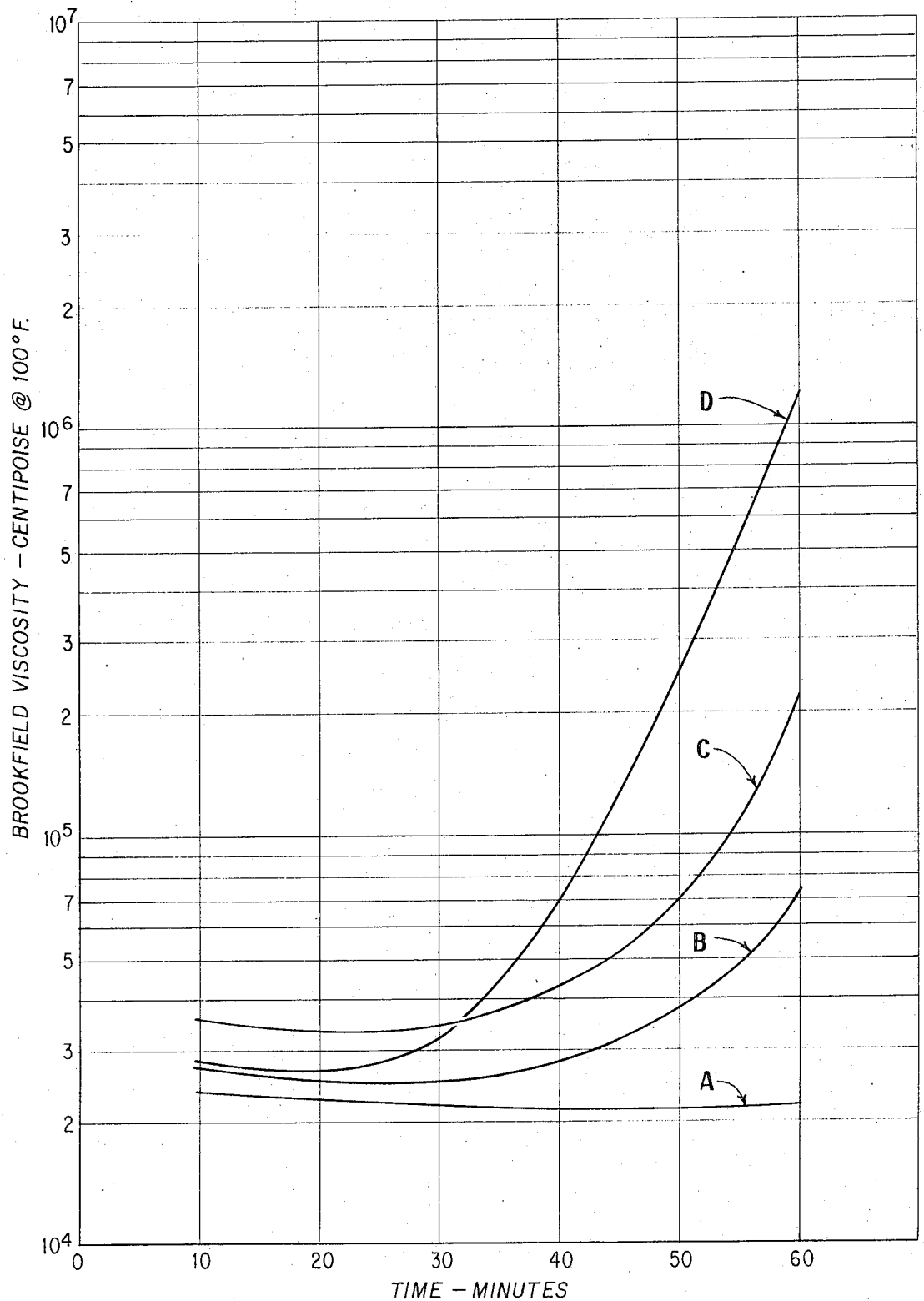

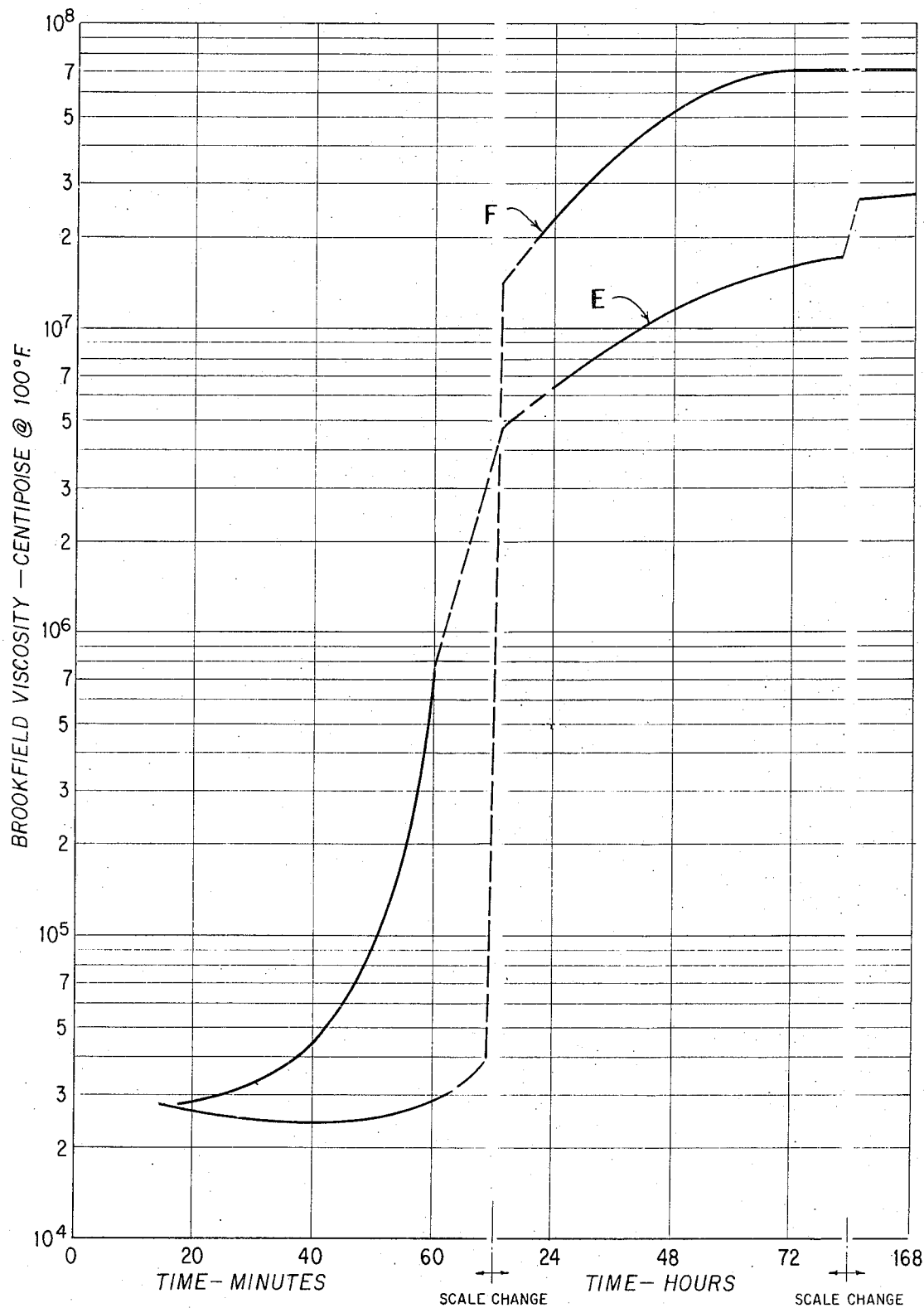

3,789,030
REGULATION OF THE VISCOSITY INCREASE IN CHEMICALLY THICKENED UNSATURATED POLYESTER FORMULATIONS
Frank R. Volgstadt, Painesville, and John R. Semancik, Mentor, Ohio, assignors to Diamond Shamrock Corporation, Cleveland, Ohio
Filed Apr. 5, 1972, Ser. No. 241,278
Int. Cl. C08f 43/02
U.S. Cl. 260—29.6 NR       13 Claims

ABSTRACT OF THE DISCLOSURE

Unsaturated polyester compositions particularly for use in the preparation of bulk molding compound and sheet molding compound stocks which are chemically thickened prior to curing, by incorporation therein of from 0.5 part to 10 parts, per 100 parts of the resin system, of an oxide or hydroxide of a Group II-A metal, e.g., $Ca(OH)_2$ and $MgO$, additionally contain a minor quantity of a water-absorptive, but essentially water-insoluble compound which is, e.g., a synthetic zeolite, silica gel or calcium sulfate. Any of these materials serve to scavenge sufficient water in the formulation to keep its initial viscosity increase to a minimum and provide an extended work-life thereto. The aging viscosity build-up in the formulation surprisingly then proceeds at a significantly accelerated rate so that thickening of the polyester to a desired high level can be attained typically within 24 hours after its preparation.

BACKGROUND OF THE INVENTION

(1) Field of the invention

The present invention relates to unsaturated polyester formulations containing chemical compounds to accelerate and/or regulate the thickening thereof. More particularly, it relates to reinforced unsaturated polyester formulations adapted for use in bulk molding compound and sheet molding compound applications having incorporated therein chemical thickening agents to facilitate viscosity build-up therein, and to methods for regulating the rate of viscosity increase in these polyester formulations to provide optimum overall increasing viscosity patterns therefor.

(2) Description of the prior art

Unsaturated polyester resins containing fillers and reinforcing agents have, as a class, enjoyed ever increasing commercial acceptance because of their desirable physical and chemical properties in end-use markets. A substantial percentage of these thermosetting resin materials produced to date has been utilized in molding application—either by transfer, compression, or injection molding techniques or in mat or in preform molding operations.

In commercial practice, the reinforced unsaturated polyester molding compositions themselves may be varied somewhat in composition, as for example, in the type of polyester or reinforcing agents incorporated therein, depending upon the particular method of fabrication employed and/or the specific properties required in the finished moldings. Also, the procedure for formulating the polyester composition will be varied depending upon the molding technique employed, i.e., whether the polyester is molded via the mat, preform, premix or sheet molding compound method. Of these molding techniques, those utilizing premix and sheet molding compound are particularly advantageous and are becoming more widely adapted commercially because of their economy, ease of operation, and greater adaptability for preparing moldings of widely divergent configuration with minimum waste.

In a premix molding process, the polyester molding composition is prepared, or premixed, to a putty-like consistency before it is placed into the mold. This "premix" is also known as "dough molding compound" or "flow mix." A compound thus prepared but which contains a chemical thickening agent to regulate its viscosity is more usually designated as "bulk molding compound." The term "bulk molding compound," or BMC, as used hereinafter is intended to refer to premixes which incorporate a chemical thickener.

Sheet molding compound, SMC, is a reinforced thermosetting compound in sheet form. It is prepared by first metering and mixing together the resin components and additives other than the reinforcing agents. The resulting mixture, which may range from liquid to paste consistency, is deposited onto a carrier film, e.g., polyethylene. Chopped reinforcement, usually glass fibers or glass mat, is then deposited onto the resin mixture, followed by a second resin-coated film as a top covering. The "sandwiched" sheet is passed through a series of rollers to achieve thorough "wet out" of the glass reinforcement and is then fed to a molding station or, alternatively, is rolled into coils for storage prior to use.

As with BMC preparation, a chemical thickening agent likewise is incorporated during preparation of SMC to accelerate viscosity build-up in the formulated resin composition for easy handling during processing.

To be suitable as a chemical thickening agent, a compound ideally should not bring about a too rapid viscosity increase of the formulation initially after its preparation so that the work-life of the formulation, i.e., the time period within which it has a flowable consistency, is sufficient to allow preparation of the reinforced molding stock and thorough "wet out" of the reinforcing fibers by the resin. Generally, formulations with viscosities of 50,000–100,000 cps. (30–60 minutes after preparation) are sufficiently liquid to properly "wet out" the reinforcing fibers. However, after preparation of the molding stock, further thickening of the formulation desirably should proceed at a much faster rate to a high-viscosity constant level at which the stock is non-tacky and essentially dry to the touch. Conversely, the action of the chemical thickener during this second stage of the overall thickening process should not cause gelation in the system and/or premature curing of the polyester so that the formulation will not flow sufficiently to fill the mold during subsequent processing operations.

In numerous existing patents and other technical articles, specific materials have been reported as useful chemical thickening agents for thermosetting resin formulations, particularly unsaturated polyester/styrene systems. For example, U.S. Pat. 2,568,331 (Frilette) first reports the use of certain Group II metal oxides or hydroxides, e.g., MgO, CaO, or $Ca(OH)_2$ as chemical thickening additives in unsaturated polyester systems. However, use of these materials generally effects such rapid initial thickening in the formulation that its work-life is significantly reduced. On the other hand, the overall build-up of the viscosity to a desirable level is quite slow. Thus, use of these compounds by themselves as chemical thickeners has not been too attractive for economical, commercial-type operations. Subsequently U.S. Patents as, for example, Nos. 2,628,209; 3,219,604; 3,390,205; 3,431,320; 3,465,061; 3,484,401; 3,538,188 and 3,609,117 each have taught modification of the basic MgO, CaO or $Ca(OH)_2$ chemical thickening system disclosed by Frilette, whereby the chemical thickening pattern of the unsaturated polyester formulation may be altered with varying results.

More recently, it has been discovered that the overall increasing viscosity pattern of unsaturated polyester formulations which utilize, as chemical thickening agents, Group II-A metal oxides singly or in combination, can be greatly affected by the presence of, e.g., water in the system. Depending upon the amount of water, the viscosity increase of the polyester can be greatly accelerated, retarded or even totally inhibited. U.S. Pat. Nos. 3,466,259 (Dow); 3,535,151 (Goodyear Aerospace); 3,631,144 (Merck and Co.); 3,631,217 (Pittsburgh Plate Glass) and French published application 2,016,314 (General Tire) each relate to the effects brought about by water in combination with, e.g., MgO, CaO or Mg(OH)$_2$ in the overall chemical thickening pattern of polyester formulations. In each disclosed method, water is added in prescribed amounts to the formulation containing the metallic compound to accelerate the viscosity build-up in the polyester to a high constant level.

While it is true that these methods can thus reduce the time cycle between formulation and cure of either BMC or SMC stock, their practice oftentimes may yield inconsistent, erratic and undesirable results, such as, e.g., excessive thickening of the formulation in too short a time (which condition minimizes the "work-life" of the formulation), or, conversely, incomplete thickening even with extended storage-aging.

Such undesirable results generally are thought to be caused by the presence of varying amounts of water in the formulation from batch to batch or from time to time.

Water may be introduced into the formulated polyester from various sources. It may be occluded and/or absorbed within the formulation ingredients, e.g., the fillers, reinforcing fibers, etc., as these materials are received from the manufacturer. Varying quantities of moisture likewise may be absorbed during mixing or during subsequent aging of the formulated material because of varying relative humidity conditions in the atmosphere.

Inconsistencies observed in overall thickening patterns of polyesters from time to time may also be attributed to modification of the polyester, as, for example, changes in its structure or composition, in its degree of esterification, i.e., acid value, and the like.

In order to obtain consistently satisfactory results in commercial practice, when using MgO, Ca(OH)$_2$ and/or CaO to chemically thicken BMC or SMC formulations with or without concomitant addition of water, polyester formulators and molders have established rigid quality control in their operations. For example, all formulation ingredients typically are dried prior to use. Likewise, both mixing and aging of the formulations are carried out under constant humidity and temperature conditions. All of these necessary procedures are, of course, time-consuming and expensive and do not provide overall unsaturated polyester molding procedures which are economically attractive.

SUMMARY OF THE INVENTION

We have now found that unsaturated polyester formulations which exhibit an optimum overall thickening pattern can be easily and consistently prepared if a water-absorptive, but essentially water-insoluble compound is included therein in prescribed amounts, along with a Group II metal oxdie or hydroxide as the chemical thickening agent, whether or not also including additional water. The water-absorbing compound scavenges water in the formulation, whereby the rate of initial viscosity increase in the formulation is regulated and the work-life of the formulation is extended to the desired degree.

Subsequent to this initial inhibited viscosity increase pattern, however, the formulation surprisingly does not likewise exhibit a retarded thickening rate due to the presence of the water-absorptive agent. To the contrary, thickening of the formulation reaches a desirable high level at least as soon as and oftentimes faster than similar formulations which exhibit a much higher rate of thickening initially. Thus, formulations containing a water-absorptive agent in accordance with this invention typically may be molded within 24 hours after preparation rather than in only 3-4 days after preparation as is oftentimes presently practiced.

An unsaturated polyester composition having an optimum overall thickening pattern in accordance with this invention comprises:

(a) an unsaturated polyester formed by reacting
    (1) at least one polycarboxylic acid, at least a portion of which contains ethylenic unsaturation and
    (2) at least one polyhydric alcohol;
(b) an ethylenically unsaturated copolymerizable monomer;
(c) an oxide or hydroxide of a Group II-A metal; and
(d) a water-absorptive, essentially water-insoluble compound selected from the group consisting of silica gel, calcium sulfate and aluminosilicates of alkali and alkaline earth meals. (The metallic aluminosilicates belong to a class of compounds commonly designated in the art as "zeolites.")

DESCRIPTION OF THE PREFERRED EMBODIMENTS

As previously described in accordance with the invention, the rate at which an unsaturated polyester resin composition is thickened by a Group II-A metal oxide or hydroxide, whether or not in combination with added water, is regulated by incorporating in said polyester resin composition, a minor quantity of a water-absorptive agent, as silica gel, calcium sulfate or one of a class of compounds designated as "zeolites," the synthetic zeolites being presently preferred. The viscosity of the composition increases initially at an insignificant rate which allows the practitioner ample time to prepare BMC or SMC stock. Subsequently, however, the viscosity build-up of the formulation proceeds at a much faster rate so that the stock reaches a desired high level, is converted to a non-tacky state, and is ready for molding operations usually within 24 hours after preparation. However, even with this much accelerated rate of viscosity increase, copolymerization of the unsaturated polyester and the ethylenically unsaturated monomer in the formulation is not initiated to any noticeable degree.

The term "unsaturated polyester" as used herein is defined as the condensation polymer produced by methods well known in the art by reacting together one or more polyhydric alcohols, e.g., glycols, and one or more polycarboxylic or polybasic acids as used heretofore for making polyesters. By way of nonlimiting example, it may be mentioned that polyesters can be prepared from such acids as maleic, fumaric, aconitic, mesaconic, citraconic, ethylmaleic and orthophthalic acids or their anhydrides (with or without other polycarboxylic unsaturated or saturated acids) and such glycols as ethylene, diethylene, triethylene, propylene, dipropylene, butylene or neopentyl glycol. It is to be understood that, in general, neither the polyester component per se nor its mode of preparation constitute a part of the present invention.

The choice of any specific type of liquid polyester for use in the improved compositions herein is not especially critical. However, suitable polyesters preferably are the so-called "linear" or "substantially linear" materials which may contain only a minimum of crosslinked molecules, as evidenced by the fact that they are soluble in solvents such as acetone. To be adaptable to the process of this invention, the polyester components likewise should be quite fluid, e.g., they will exhibit viscosities of 1,000–10,000 cps., so that the viscosity of subsequent formulations thereof with fillers, etc., normally will not exceed about 50,000 cps. initially and are adapted to being thickened to the desired degree upon addition of chemical thickening agents.

A typical linear polyester for use herein is prepared by carrying out the esterification reaction substantially to completion, i.e., to an acid number of less than about 80, without permitting substantial (addition) polymerization to take place. Particularly preferred polyester components for use herein include those derived from 0.8–1.2 moles of ethylene glycol, diethylene glycol, propylene glycol, dipropylene glycol and neopentyl glycol for each 1.0 mole of maleic and/or fumaric, orthophthalic, isophthalic, tetrahydrophthalic and adipic acids or their anhydrides. Modified diethylene, dipropylene, ethylene, propylene or neopentyl maleates or fumarates also may be employed as well as bisphenol-modified and halogenated or phosphorous containing acids or glycols which yield chemical and flame-resistant polyesters. These compounds are preferred at present from a standpoint of economics and the desirable properties that they produce in the end product.

The terms "polyester resin," "polyester components," or "resin system" as may be used herein are each intended to refer broadly to the combination of the above described condensation polymer, i.e., unsaturated polyester with an ethylenically unsaturated monomer which will subsequently copolymerize with the unsaturated polyester during curing operations to yield a solid, insoluble, cross-linked polymeric material.

Specific monomers which are presently preferred for use herein contain ethylenic unsaturation

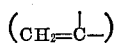

attached to a phenyl ring as, e.g., styrene, chlorostyrene, t-butylstyrene, vinyl toluene, divinyl benzene, alpha-methyl styrene and the like. The presently preferred proportion of monomer employed ranges from about 0.2 to 1.6 parts per each part of polyester, and still more preferably from 0.3 to 1.5 parts per part of polyester to assure the most uniform and efficient cross-linking thermosetting reaction.

In formulating the thermosetting composition, fillers and reinforcing agents typically are added to reduce the resin requirement and/or to enhance the physical properties of the molded article. Examples of suitable fillers are clay, ground limestone or whiting, gypsum, talc, calcium carbonate and cellulose in any form. Aluminum hydrate, sodium borate or antimony oxide may also be incorporated to enhance flame resistance. Suitable reinforcing agents include chopped glass fiber, glass mat, sisal, asbestos and other synthetic fibers such as nylon, polyester and acrylic fibers as well as high temperature fibers notably carbon and boron fibers.

Additional additives, such as, e.g., plasticizers, mold lubricants, etc., also are usually present in the thermosetting compositions. Further, thermoplastic polymer additives, such as polystyrene, polyacrylate, polymethacrylate, poly(vinyl chloride) and various vinyl chloride copolymers (which thermoplasts are commonly designated as "low profile" additives) may likewise be included in the composition to aid in the production of moldings with good surface smoothness.

It is to be noted that the incorporation of any specific filler, reinforcing agent, thermoplastic polymer or other additive in the thermosetting composition does not, in itself, constitute a part of the present invention.

In accordance with the invention, the rate of thickening in the polyester resin composition both initially and with aging is regulated by incorporating therein a water-absorptive agent along with the chemical thickening agent. Specifically, the chemical thickening agent is any oxide or hydroxide of a Group II-A metal, with MgO, $$Mg(OH)_2,$$

and $Ca(OH)_2$ being especially satisfactory and presently preferred.

The water-absorptive material specifically can presently be either a fine pore-sized synthetic zeolite, silica gel or calcium sulfate.

Suitable synthetic zeolites are crystalline metallic aluminosilicates wherein the metal is an alkali or alkaline earth metal, e.g., sodium, potassium, calcium, etc. They are characterized by a crystalline structure which is a rigid, three-dimensional framework of $SiO_4$ and $AlO_4$ tetrahedra covalently bound together to form truncated octahedra joined in a cubic configuration and forming a honeycomb, multicoreitz crystalline structure. Most effective zeolites employed herein have nominal pore diameters (cavities) of 3–5 angstroms. A common designation for these materials as obtained commercially is "molecular sieves."

In general, from about 0.05 percent to 5.0 percent of the water-absorptive agent, by weight of the polyester component, may be incorporated in the polyester formulation in order to remove excess water which might cause the viscosity of the formulation to build-up too quickly and thus reduce its work-life. Care must be taken, however, not to employ sufficient water-absorptive agent to remove all water from the formulation, so that the desired improvements in its overall viscosity pattern will not be effected. Some water must be present in the system to attain the desired viscosity pattern when using a chemical thickener such as MgO, CaO, $Ca(OH)_2$ or the like.

By practice of this invention, polyester formulations can be prepared which exhibit insignificant thickening for time periods of e.g., up to 60 minutes after preparation. The formulation thus has an extended work-life which allows the formulator ample time to prepare BMC or SMC stock. After such time period, however, the viscosity build-up of the resin formulation accelerates so rapidly that the stock typically may be molded after being prepared 24 hours or less.

The proper level of water-absorptive agent to be employed in any particular polyester formulation can be easily and quickly determined herein by preparing one or more small samples of the formulation and adding a different amount of the water-absorptive agent to each. Within a short time period, e.g., 20–30 minutes, viscosity measurements of the prepared formulations will indicate the proper amount of the water-scavenger to be used to provide an ample work-life to the formulation. Typically, this prescribed amount of water-absorptive agent will likewise provide the accelerated thickening rate desired in the formulation upon aging.

As previously pointed out herein and as taught in the patent literature, polyester formulations which contain Group II-A metal oxides or hydroxides as chemical thickeners and which likewise contain small quantities of additional water exhibit a faster thickening rate than do similar formulations wherein no water is present. The thickening pattern of any specific formulation, particularly within 30–60 minutes after its preparation, likewise can be significantly modified by the amount of atmospheric moisture present, i.e., the ambient relative humidity conditions existing in the mixing area.

Accompanying FIG. 1 graphically illustrates the variations which may be effected in the thickening rate of a polyester formulation by preparing it under varying ambient relative humidity conditions. Curve A represents the plot of the thickening rate in a formulation both prepared and tested at 17 percent ambient relative humidity. Curve B is a similar plot for a sample formulation prepared and tested at 19 percent relative humidity. Curve C represents the aging viscosity pattern of a formulation prepared and tested in a 33 percent relative humidity atmosphere. Curve D is the viscosity v. time pattern observed in the formulation when it is prepared and tested under 50 percent relative humidity conditions. The basic formulation employed, procedure for preparing the various samples under varying humidity conditions and the aging viscosity data therefor are set forth in Example 2 below. Examination of the graphic data illustrated in FIG. 1 shows that in approximately 30 minutes after preparation, those formulations prepared and tested at higher ambient relative humidity thicken at a much faster rate than those exposed to lower relative humidity conditions.

Accompanying FIG. 2 illustrates the improvement typically obtained in the overall thickening rate of a polyester formulation by incorporating a water-absorptive agent therein in accordance with this invention. Curve E represents a plot of increasing viscosity vs. aging measured for a specific formulation prepared and tested under 50% ambient relative humidity conditions. Curve F is the aging viscosity pattern of the same formulation likewise prepared and tested under 50% ambient relative humidity conditions, which formulation has incorporated, per each 100 parts of the resin system, 0.5 part of a synthetic zeolite as water-scavenger. Details of the specific polyester formulation employed, preparation of the two sample formulations and the viscosity determinations are set forth in Example 3 below.

As shown in the graph, the rate of viscosity increase of the latter formulation is not noticeable for at least 60 minutes after its preparation. However, the viscosity buildup in the formulation has reached a sufficiently high level within 24 hours after preparation that it may be molded into finished articles. The overall thickening rate of the formulation is markedly different from that of the formulation containing no water-scavenger (Curve E). This latter formulation is found to thicken initially at a much faster rate than the formulation prepared in accordance with this invention, while thereafter thickening at a slower rate, continually increasing in viscosity to a maturation level only about 7 days after preparation.

By the process of this invention, one can conveniently control the overall thickening pattern of polyester formulations so that they consistently will have a desirable, extended work-life, regardless of varying moisture content therein or the varying atmospheric conditions in which they are prepared. At the same time, these formulations, subsequent to working, surprisingly will thicken at such an accelerated rate that impregnated stocks thereof can be molded typically within 24 hours after preparation.

Accordingly, the process of this invention provides to the practitioner overall polyester molding procedures which are faster, more convenient and more economical than those generally practiced at present. By the simple expedient of adding the required amount of water-absorptive agent to his formulation, the practitioner does not have to exercise such rigid control over raw materials employed nor the conditions under which his formualtions are prepared and aged. Likewise, by practicing the present invention, the molder will not have to wait for 3-5 days after stock preparation before finishing operations to be sure that the stock will exhibit the proper flow characteristics during cure.

It is also to be noted that the process of this invention can likewise provide improved overall thickening patterns of polyester formulations which incorporate additional water as taught, for example, in U.S. Pat. Nos. 3,466,259; 3,631,144 or 3,631,217. In such formulations, it has been observed that while thickening maturation in the polyester may be attained quicker by the addition of water, the initial viscosity increase of the formualtion generally is too rapid to provide a sufficient work-life.

Several examples are set forth below to illustrate the nature of the invention and the manner of carrying it out. However, the invention should not be considered as being limited by the details thereof. In these examples and elsewhere herein where proportions of ingredients may be given in parts, such proportions are by weight unless otherwise noted.

Example 1

An unsaturated polyester for use in the practice of this invention is prepared by esterifying 1.05 M of propylene glycol with 0.33 M of isophthalic acid and 0.67 M of fumaric acid to an acid number of less than 30 (acid value is defined as the number of milligrams of alkali, calculated as potassium hydroxide, required to neutralize the free acid in one gram of sample).

Example 2

To determine the effects of different ambient relative humidity conditions on the rate of viscosity increase of polyester formulations containing a Group II metal oxide as chemical thickening agent, the following polyester formulation is prepared in an area maintained at 73° F., under controlled humidity conditions as indicated below.

Formulation: Parts
- Polyester of Example 1 _____ 150
- Vinyl chloride copolymer [1] _____ 54
- Styrene _____ 196
- Calcium carbonate _____ 400
- Calcium hydroxide, $Ca(OH)_2$ _____ 12

[1] Copolymer contains, by weight, 50–55% vinyl chloride, has a reduced viscosity of 0.45–0.50 (1% solution in cyclohexanone at 30° C.), and an acid value of 5.0.

For each sample formulation, the polyester, thermoplastic vinyl chloride copolymer, styrene, and calcium carbonate are mixed thoroughly with high-shear agitation until the temperature of the mixture reaches 100° F. The mixture is then allowed to stand for 5 minutes, after which the $Ca(OH)_2$ is stirred into the mixture and storage timing of the prepared formulation is begun. The total mix is poured into a wide-mouthed glass bottle positioned in a water bath regulated at 100° F. The viscosity of the mixture is measured at prescribed intervals over a time period of 60 minutes, using either a Model RVT Brookfield viscometer with a No. 6 spindle or a HBT Model with a No. 3 spindle.

Using this procedure, the following results are obtained:

| Minutes after blending | Viscosity, $10^3$ cps., formulation preparation, relative humidity of— | | | |
|---|---|---|---|---|
| | 17% | 19% | 33% | 50% |
| 5 | 22 | 29 | 40 | 32 |
| 10 | 24 | 27 | 36 | 28 |
| 20 | 23 | 25 | 34 | 27 |
| 30 | 22 | 25 | 34 | 32 |
| 40 | 21 | 28 | 48 | 70 |
| 50 | 22 | 38 | 60 | 259 |
| 60 | 22 | 73 | 220 | 1,200 |

The above results show that the thickening rate of a polyester formulation which includes a Group II metallic hydroxide as chemical thickener is increasingly accelerated within the first hour after preparation, the higher the ambient relative humidity conditions existing during its preparation and subsequent testing. Lower ambient relative humidity conditions appear to provide formulations which maintain a fairly stable viscosity over a 60-minute period and have an extended work-life.

For each sample, the bottle was then closed and stored several days in a constant temperature oven (90° F.), during which time period the further viscosity build-up of the formulation was checked at specified intervals by measuring the degree of hardness of the mix, using a Penetrometer (Precision Scientific Company) fitted with a Humboldt No. H–1310 needle and a 100 g. weight. With the tip of the needle at the surface of the sample, the clutch of the instrument was disengaged for five (5) seconds and the Penetrometer reading was noted (the lower the number, the harder the sample). An average of at least 3 readings at one time was recorded. Using this procedure, results were as follows:

| Penetrometer reading at 90° F., after— | Preparation, relative humidity of— | | | |
|---|---|---|---|---|
| | 17% | 19% | 33% | 50% |
| 1 day | 192 | 220 | 270 | 255 |
| 2 days | 181 | 191 | | 210 |
| 3 days | 165 | 190 | | |
| 4 days | | | 205 | |
| 5 days | | | 156 | 105 |
| 6 days | 134 | 137 | 145 | 120 |
| 7 days | 128 | 120 | | 128 |
| 11 days | | | 120 | |

All of the above formulations exhibited tack-free surfaces within the first 24 hours after storage, while that prepared under the lowest relative humidity conditions exhibited the highest viscosity (was harder).

Example 3

This example illustrates the improved overall increasing viscosity pattern exhibited by a polyester formulation containing a small quantity of water-absorptive agent in accordance with this invention, by comparison to that observed for the same formulation without the water-absorptive agent. For the test, both sample formulations are prepared under 50% humidity conditions, following the general mixing procedure set forth in Example 2 above and using substantially the same formulation. To one formulation is added immediately after the $Ca(OH)_2$ addition, 2 g. of a synthetic zeolite (4A molecular sieves—Linde Div., Union Carbide Corporation). This amount of the zeolite corresponds to 0.5 part per each 100 parts of polyester component. Storage timing of the formulations is begun after preparation. Each mixture is poured into a wide-mouthed glass bottle positioned in a water bath regulated at 100° F. and its viscosity is measured at prescribed intervals, following the procedure set forth in Example 2. The following results are obtained:

| Minutes after blending | Viscosity, $10^3$ cps. | |
|---|---|---|
| | Without molecular sieves | With molecular sieves |
| 5 | 32 | 28 |
| 10 | 30 | 26 |
| 20 | 28 | 26 |
| 30 | 30 | 25 |
| 40 | 44 | 24 |
| 50 | 136 | 24 |
| 60 | 750 | 28 |

For each sample, the bottle is then closed and stored several days in a constant temperature oven at 90° F. During this time period, the further viscosity build-up of each formulation is checked at specified intervals via two different methods. In one, the degree of hardness of the mix is measured, using the Penetrometer test outlined in Example 2. An average of at least 3 readings at one time is recorded. The Brookfield viscosity of the mixtures is measured at intervals, using the HBT Model Viscometer, with a Helipath Stand attachment, and the TF spindle. Using these procedures, results are as follows:

| Days after blending | Penetrometer reading at 90° F. | | Viscosity reading $10^6$ cps. | |
|---|---|---|---|---|
| | Without molecular sieves | With molecular sieves | Without molecular sieves | With molecular sieves |
| 1 | 335 | 172 | 6.4 | 23 |
| 2 | 242 | | 11.5 | |
| 3 | 198 | 112 | 16.0 | 75 |
| 4 | | 116 | | 70 |
| 5 | | 112 | | 75 |
| 7 | 155 | 116 | 28.0 | 70 |

As the above data indicate, the formulation which contains the molecular sieves remains at a fairly constant fluidity level for at least 60 minutes after preparation. Thereafter, it increases in viscosity at a rate which is significantly more rapid than that exhibited by the formulation with no added water-absorptive agent. The formulation in accordance with this invention attains a much higher viscosity level within 24 hours after preparation than does the comparative formulation.

Examples 4–7

To further illustrate the process of this invention, a series of formulations are prepared in a 50% relative humidity atmosphere as previously described, each formulation containing the polyester of Example 1 and incorporating, for each 100 parts of the resin system, 100 parts of calcium carbonate filler and 3 parts $Ca(OH)_2$ as the chemical thickening agent. Varying quantities of water-absorptive agents are incorporated as listed in the following table. The formulation prepared at 50% ambient relative humidity (in Example 2) serves as a control. Viscosities are measured for each formulation initially after preparation and Penetrometer readings are subsequently obtained as an indication of the degree of maturation in each sample. Using this procedure, results are as follows:

| | | Example number | | | |
|---|---|---|---|---|---|
| | Control | 4 | 5 | 6 | 7 |
| Water-absorptive agent, parts: | | | | | |
| None | | | | | |
| 3A molecular sieves | | 0.2 | | | |
| 4A molecular sieves | | | 0.2 | | |
| Silica gel | | | | 1.25 | |
| $CaSO_4$ | | | | | 1.25 |
| Brookfield viscosity, $10^3$ cps., time after blending of— | | | | | |
| 10 min | 28 | 20 | 28 | 34 | 32 |
| 20 min | 27 | 25 | 25 | 32 | 32 |
| 30 min | 32 | 25 | 25 | 32 | 32 |
| 60 min | 1,200 | 128 | 124 | 40 | 32 |
| Penetrometer reading after storage of— | | | | | |
| 1 day | 255 | 234 | 242 | 252 | 178 |
| 2 days | 210 | 106 | 116 | 158 | 96 |
| 3 days | | 102 | 102 | 130 | 88 |
| 1 week | 128 | 102 | 100 | 118 | 86 |

As these results indicate, those formulations containing the specified quantities of water-absorptive agent all remain extremely fluid for at least 60 minutes after preparation, by comparison to the control formulation. Subsequently, each of these formulations attains at least an equivalent, if not greater, degree of hardness than the control formulation as evidenced by their lower needle penetrometer measurements (the lower the number, the harder the material).

Example 8

An unsaturated polyester is prepared as outlined in Example 1 by esterifying 1.05 M of propylene glycol with 0.33 M of isophthalic acid and 0.67 M of maleic acid to an acid number of less than 30.

Employing this polyester, two formulations are prepared with added water, each containing, per 100 parts of the resin system, 100 parts calcium carbonate, 7.5 parts of $Ca(OH)_2$ as chemical thickener and 0.2 part water. To one formulation is added 0.5 part 3A molecular sieves, per 100 parts of the resin system. Viscosity readings are obtained for each formulation initially after preparation and penetrometer readings are made 24 hours after preparation. Results obtained are as follows:

| Formulation | Brookfield viscosity, $10^3$ cps., after preparation of— | | | | | | | Penetrometer Reading after 1 day |
|---|---|---|---|---|---|---|---|---|
| | 5 min. | 10 min. | 20 min. | 30 min. | 40 min. | 50 min. | 60 min. | |
| Without molecular sieves | 32 | 20 | 132 | >2M | | | | 168 |
| With molecular sieves | 35 | 32 | 32 | 35 | 64 | 203 | >2M | 128 |

The formulation containing the water-absorptive agent remains fluid significantly longer than that with no added agent, thus providing an extended work-life to the formulation. However, this formulation reaches a noticeably higher viscosity level within 24 hours after preparation as indicated by its lower penetrometer reading compared to the formualtion with no added water-absorptive agent.

A control formulation containing neither added water nor water-absorptive agent exhibits a penetrometer reading of 152 one day after preparation.

Example 9

A polyester mixture is prepared containing for each 60 parts of the product of Example 8, 40 parts of the brominated polyester described in U.S. Pat. No. 3,536,-782, which reactive polymer is prepared by directly brominating an unsaturated polyester obtained by conventional means known in the art. Formulations with this mixture are then blended which incorporate for each 100 parts of the total resin ssytem, 100 parts calcium carbonate, 7.5 parts Ca(OH)$_2$ and 0.2 part water. Five-tenths part of 3A molecular sives is added to one of the formulations. A formulation containing neither water nor molecular sieves serves as a control.

Initial viscosities are determined for each of the formulations as previously described, and penetrometer readings are obtained for the formulations after aging, with the following results:

| Formulation | Viscosity, 10$^3$ cps., after preparation, of— | | | | Penetrometer readings after— | |
|---|---|---|---|---|---|---|
| | 5 min. | 10 min. | 20 min. | 30 min. | 1 day | 2 days |
| Control | 13 | 10 | 10 | >2M | 216 | 190 |
| Without molecular sieves | 12 | 44 | >2M | | 264 | 108 |
| With molecular sieves | 12 | 14 | 168 | >2M | 200 | 88 |

These results show that while the quantity of water-absorptive agent employed in this example is insufficient to noticeably retard viscosity increase of the formulation by comparison to either the control formualtion or that incorporating water alone, maturation of the formulation containing the water-absorptive agent is greatly accelerated as indicated by its significantly lower penetrometer readings.

Example 10

This example illustrates the effects which can be obtained acording to this invention by incorporating a water-absorptive agent in a typical polyester formulation. Employing the polyester as in Example 3, formulations are prepared each incorporating per 100 parts of the total resin system, 100 parts calcium carbonate, 3 parts Ca(OH)$_2$ and 0.2 part water. To one formulation is added 1.25 parts of 3A molecular sieves, per 100 parts of the resin. Viscosity measurements and penetrometer readings are obtained for these formulations as previously described with the following results:

| Formulation | Viscosity, 10$^3$ cps., time after preparation of— | | | | Penetrometer readings after 1 day |
|---|---|---|---|---|---|
| | 5 min. | 10 min. | 20 min. | 60 min. | |
| Without molecular sieves | 24 | 1.4M | 1.6M | | 258 |
| With molecular sieves | 24 | 32 | 30 | 32 | 265 |

A control formulation containing no added water or molecular sieves exhibits a 1-hour aged viscosity of 750,000 cps., and a penetrometer reading of 335.

The formulation of this example which contains the water-absorptive agent has an extended work-life, its viscosity remaining substantially unchanged for at least 60 minutes after preparation. Its aging viscosity pattern, i.e., maturation, is comparable to that of the formulation which contains only added water, however, and is significantly better than that of the control formulation.

It is to be understood that although the invention has been described with specific reference to particular embodiments thereof, it is not to be so limited, since changes and alterations therein may be made which are within the full intended scope of this invention as defined by the appended claims.

We claim:

1. A liquid unsaturated polyester composition having initially after preparation and in the presence of minor amount of moisture a retarded thickening rate and an extended work-life while exhibiting a greatly accelerated thickening rate thereafter which comprises
    (a) an unsaturated polyester formed by condensing at least one ethylenically unsaturated polycarboxylic acid with at least one polyhydric alcohol;
    (b) an ethylenically unsaturated monomer which is subsequently copolymerized with said unsaturated polyester;
    (c) at least one oxide or hydroxide of a Group II-A metal as a chemical thickening agent for the composition prior to initiation of the copolymerization reaction; and
    (d) a water-absorptive agent selected from the group consisting of silica gel, calcium sulfate and aluminosilicates of alkali metals and alkaline earth metals, the amount of said water-absorptive agent being from about 0.05 to 5 percent, by weight, of components (a) and (b).

2. The composition of claim 1 which contains up to 1.0 percent by weight, based on the total weight of the resinous components of added water.

3. The composition of claim 1 wherein the Group II-A metal of component (c) is calcium.

4. The composition of claim 1 wherein the Group II-A metal of component (c) is magnesium.

5. The composition of claim 1 wherein the water-absorptive agent is an alkali metal aluminosilicate.

6. The composition of claim 1 which contains a thermoplastic polymer as a low profile additive.

7. The composition of claim 1 which further contains a filler material.

8. The composition of claim 1 wherein component (a) is at least partially a halogenated, fire-retardant, reactive polyester.

9. In a liquid unsaturated polyester composition comprising
    (a) an unsaturated polyester formed by condensing at least one ethylenically unsaturated polycarboxylic acid with at least one polyhydric alcohol;
    (b) an ethylenically unsaturated monomer which is subsequently copolymerized with said polyester; and
    (c) at least one oxide or hydroxide of a Group II-A metal as a chemical thickening agent for the composition prior to initiation of the copolymerization reaction,
the improvement which comprises adding to said composition from about 0.05 to 5 percent, based on the weight of the resin system, of a water-absorptive agent selected from the group consisting of silica gel, calcium sulfate and aluminosilicates of alkali metals and alkaline earth metals, whereby the thickening rate of the composition in the presence of minor amounts of moisture is initially retarded to provide an extended work-life thereto while the thickening rate of the composition is thereafter greatly accelerated to substantial maturation 24 hours after preparation.

10. The method of claim 9 wherein the composition contains up to 1.0 percent by weight based on the total weight of the resinous components.

11. The method of claim 9 wherein the Group II-A metal of component (c) is calcium.

12. The method of claim 9 wherein the Group II-A metal of component (c) is magnesium.

13. The method of claim 9 wherein the water-absorptive agent is an alkali metal aluminosilicate having an average pore diameter of 3–5 angstroms.

References Cited

UNITED STATES PATENTS

| | | | |
|---|---|---|---|
| 3,432,458 | 3/1969 | Kwan et al. | 260—33.4 |
| 3,466,259 | 9/1969 | Jernigan | 260—37 |
| 3,631,144 | 12/1971 | Deis et al. | 260—40 R |
| 3,631,217 | 12/1971 | Rabenold | 260—863 |
| 3,632,545 | 1/1972 | Ferraro | 260—30.6 R |

WILLIAM H. SHORT, Primary Examiner

E. H. NIELSEN, Assistant Examiner

U.S. Cl. X.R.

260—40 R, 865

UNITED STATES PATENT OFFICE
CERTIFICATE OF CORRECTION

Patent No. 3,789,030      Dated January 29, 1974

Inventor(s) Frank R. Volgstadt and John R. Semancik

It is certified that error appears in the above-identified patent and that said Letters Patent are hereby corrected as shown below:

Claim 10 should read as follows:

The method of Claim 9 wherein the composition contains up to 1.0 percent by weight, based on the total weight of the resinous components, of added water.

Signed and sealed this 17th day of September 1974.

(SEAL)
Attest:

McCOY M. GIBSON JR.
Attesting Officer

C. MARSHALL DANN
Commissioner of Patents